Sept. 8, 1942.     J. M. COONEY ET AL     2,295,029
POWER TRANSMISSION BELT
Filed March 3, 1939
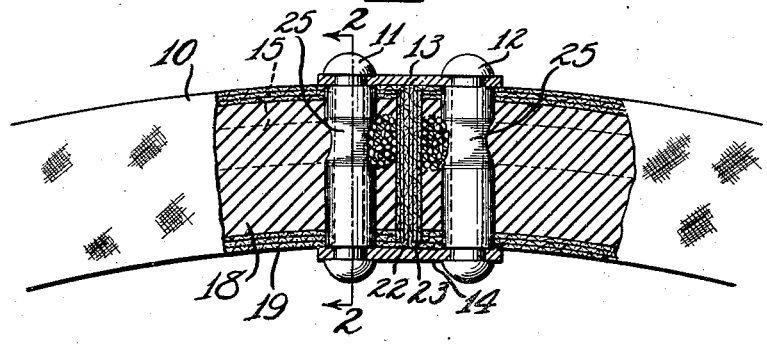
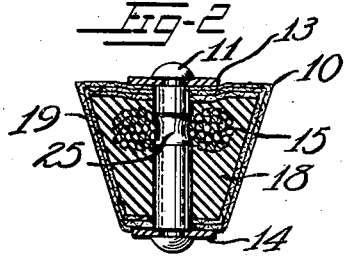
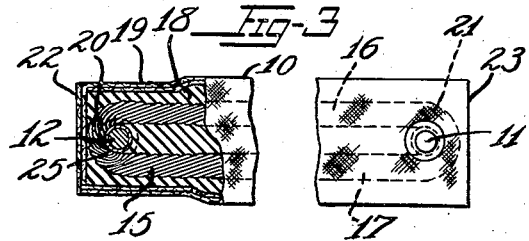
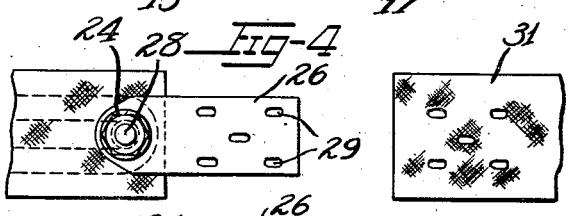
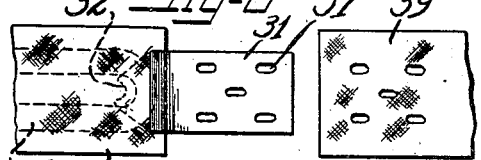
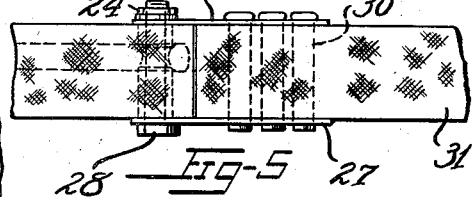
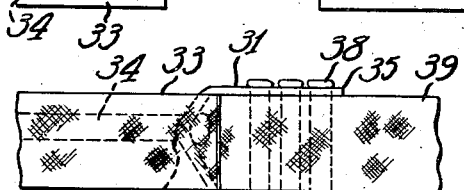
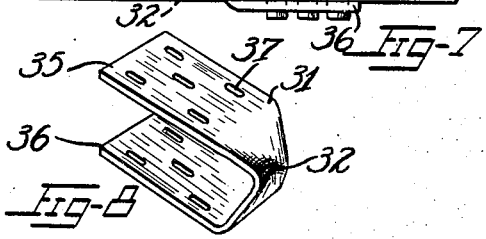
Inventors
John M. Cooney
William B. Collier
By Willis F. Avery
Atty Patented Sept. 8, 1942

2,295,029

UNITED STATES PATENT OFFICE 2,295,029

POWER TRANSMISSION BELT

John M. Cooney, Akron, and William B. Collier, Tallmadge, Ohio, assignors to The B. F. Goodrich Company, New York, N. Y., a corporation of New York Application March 3, 1939, Serial No. 259,588

1 Claim. (Cl. 24—31)

This invention relates to power transmission belts, and to the method of making the same, and it is especially useful in side driving V-belts, although as to some of its features, it is applicable also to flat power transmission belts.

In some installations, such, for example, as in the driving of electric lighting generators from the axles of railway cars, it is desirable to use belts which are not endless and which have their ends connected together by fastener means so that the belt may be removed or replaced conveniently. It is desirable in some uses to provide repair links which may be used to connect together the ends of belts after a defective piece has been removed therefrom or for lengthening a belt for use in a new location. In both cases it is necessary to connect the belt ends for operation as endless belts. Where side driving V-belts of rubber and fabric construction have been employed, complicated hinged belt connectors have been resorted to, and difficulty has sometimes been experienced in securing the belt fasteners without weakening the belt where the fastener is applied. Such fasteners usually have been bolted or riveted to the belt end. The material removed from the belt end to provide the necessary bolt or rivet holes weakens the belt and in the prior constructions the strength of the coupled joint ordinarily has been dependent upon the shearing strength of the material between the bolt or rivet holes and the end of the belt.

Further, a serious objection to prior belt constructions has been that where adequate tensile strength has been provided the belt has usually been too stiff for maximum efficiency of power transmission, or has been short-lived, in severe uses.

The principal objects of this invention are to provide an improved belt construction in which the difficulties above discussed are greatly reduced or eliminated; to provide in the same belt, greater strength and greater flexibility than in prior constructions, thereby providing greater efficiency of power transmission and longer belt life, and to provide for convenience of manufacture and simplicity of structure.

Further objects are to provide improved means for connecting belt ends, to provide an improved connection of such compactness that a hinged connector is unnecessary; to provide an improved belt link; and to provide an improved connection for securing the link to belts of various constructions.

These and other objects will appear from the following description and the accompanying drawing.

Of the drawing,

Fig. 1 is a side elevation of a belt and connector constructed according to and embodying the invention, parts being broken away and parts being shown in section.

Fig. 2 is a cross section thereof taken on lines 2—2 of Fig. 1.

Fig. 3 is a plan view, parts being sectioned and broken away, of the belt of Fig. 1 laid straight.

Fig. 4 is a plan view of belt ends, showing how a link belt of the improved construction may be attached to a belt of another construction.

Fig. 5 is a side elevation of the belt ends of Fig. 4 with the ends connected.

Fig. 6 is a view similar to Fig. 4 showing a modified construction.

Fig. 7 is a side view of the belt ends of Fig. 6 with the belt ends connected.

Fig. 8 is a perspective view of the fastener element of Figs. 6 and 7.

Referring to the drawing, the numeral 10 designates a belt of the side driving V-belt type having metallic pins 11, 12 extending vertically through its body near the ends thereof and having projecting ends for securing metallic strap fastener members 13, 14 whereby the ends of the belt may be joined. Within the body of the belt is a flexible element 15, looped about the pins 11, 12 and extending therebetween preferably in parallel spaced-apart reaches 16, 17, said link comprising the principal tension-resisting element of the belt.

In the preferred embodiment, the element 15 comprises an endless grommet made of strong cotton cord laid upon itself in parallel helices to form an endless cable which has advantages hereinafter discussed. If desired, the endless element 15 may be made by winding one or more cords or other suitable strand material in an endless loop without cabling it, and other materials such as rayon, linen, or other fibrous material or metallic wire or even chain or cable may be employed. The cotton cord or other material is preferably rubberized prior to incorporation in the belt by passing it through a solution or dispersion of rubber and preferably drying it under tension to reduce its elongation. The tension may be applied before the cord is wound into the grommet or after, or both. The rubber coating not only assists in holding the cord in cabled formation, but reduces friction and serves to unite the cord to the surrounding rubber material after it is incorporated in the belt.

The body 18 of the belt is formed of rubber composition or other rubber-like material, and a cover 19 of one or more plies of fabric, preferably bias laid to give flexibility is provided to protect the belt against abrasion. The endless grommet supplies a loop 20, 21 at each end of the belt. These loops closely encompass the metal pins 11, 12 and the tension load is transmitted directly from the reinforcing grommet to the pins.

Owing to the cabled arrangement of the cords in the grommet in the preferred embodiment, which grommet is looped about the tension-transmitting pins, the tension is automatically divided equally not only between the two reaches of the grommet but also between the individual courses of the cord of the grommet, so that the grommet as a whole takes the load, and individual courses of the cord are not unduly stressed. Also, the arrangement of the grommet in a flat loop with the courses thereof side by side between the side driving faces of the V-belt provide adequate transverse stiffness especially as the belt is exceptionally flexible longitudinally so that very efficient pulley engagement is obtained with minimum belt wear.

To provide flexibility at the joint the pins 11, 12 are located very close to the ends of the belt, only sufficient space being provided between each pin and its respective end belt face to permit the loop to encompass the pin and preferably provide for end covering plies 22, 23 which may be continuations of the belt cover. This construction permits the use of connectors of minimum length, which may be in the form of strap plates 13, 14 apertured to receive the heads of the pins, as shown. When splicing the belt, the ends preferably are brought into intimate contact so that the pulley contacting sides of the belt are continuous and provide uniform traction throughout. Because the tension load is carried directly from the grommet to the pins, the strength of the structure does not depend merely upon the other belt material between the pins. Also, only the short length of the belt from pin to pin is stiff and as this zone may be kept very short, the flexibility of the belt for pulley operation is not adversely affected. Flexibility is thus provided at the joint without the use of hinged couplers or similar devices requiring lubrication and having metallic wear surfaces.

The total length of the straps 13, 14 is so small that it may be less than the length of anchoring members of hinge type fasteners and therefore detracts less from the flexibility of the belt. The absence of gaps in the belt provides quiet and uniform operation and no metallic parts are present on the driving faces of the belt.

Where the strap members are to remain in place permanently, their ends, which project above and below the body of the belt, may be riveted or spun as illustrated in Fig. 1. When, however, it is desired to provide for ready removal of the belt, the pins may be threaded to receive retaining nuts 24 as shown in Fig. 4, or other removable fastening means such as cotter pins may be employed. The pins 11, 12 may also be made hollow and rivets or bolts may be passed therethrough, as shown in Figs. 1 to 3.

For economy of material and to obtain close spacing of the pins as well as to prevent shifting of the pins with relation to the grommet, the pins 11, 12, may be grooved to provide seats at 25. The grommet may also be flattened in cross section as it rounds the pins, thereby requiring less space between the pins and the ends of the belt.

In the manufacture of the belt the pins 11, 12 are mounted in a channel-shaped mold member at the desired distance apart, the grommet 15 is then looped about the pins under tension, and material comprising the body of the belt is assembled about the grommet and the pins, and subjected to compacting molding pressure and vulcanizing temperatures.

In addition to making possible the improved belt connection herein described, the belt construction itself has shown superior life and power transmitting efficiency in severe use. Apparently, the improved results are due in a large measure to the action of the endless grommet in equalizing the tension in its two reaches as a result of encircling the end pins, and to the great flexibility of this construction coupled with the automatic adjustability of the belt components so that stresses are not objectionably localized.

The improved V-belt is applicable in all uses for side-driving belts. The invention is applicable also to flat belts, in which case, by insetting or embedding the connector plate and pin heads at one or both faces of the belt, a flush pulley engaging face will be presented.

Where a belt section or link having the grommet reinforcement is to be spliced to a belt section of some other construction, connector straps 26, 27, as shown in Figs. 4 and 5 may be employed. These straps are perforated at one end with a single perforation to receive a belt pin 28 and have a plurality of perforations 29 at the other end to receive rivets 30 passing through the belt section 31 of ordinary construction. In similar situations a sheet metal stamping or shackle 31 such as that illustrated in Figs. 6 to 8 may be employed. The loop end 32 of the shackle is embedded in the end of the belt section 33 with the grommet reinforcement 34 thereof passed thereabout. The wings 35, 36 of the shackle are perforated as at 37 to receive rivets 38 whereby the shackle may be attached to a belt section 39 of ordinary construction.

The forms of the invention illustrated in Figs. 4 to 8 are especially useful where a grommet type belt of standard length is to be employed in a position requiring a longer belt, as other belt material of ordinary construction may be used to splice out the belt to the desired length.

Short links of standard lengths each comprising a grommet extending about end pins of metal may be used as repair links or may be joined to provide belts of any length.

Modifications may be made without departing from the scope of the invention as it is defined by the following claim.

We claim:

A side driving belt comprising a flexible two-ended body of trapezoidal cross-section including rubber-like material, a single flexible, endless cord grommet disposed in a single elongated loop with the two intermediate reaches of said loop disposed side by side between the side driving faces of said body and embedded therein, and with the two end portions of the loop disposed at the ends of said body, connector pins at least partially embedded in said body within the end portions of said loops and having portions extending to the exterior of said body, and exterior connector means engaging said pins.

JOHN M. COONEY.
WILLIAM B. COLLIER.